United States Patent
Tsuda

(10) Patent No.: US 8,421,886 B2
(45) Date of Patent: Apr. 16, 2013

(54) DIGITAL CAMERA

(75) Inventor: Yutaka Tsuda, Kawasaki (JP)

(73) Assignee: Nikon Corporation, Tokyo (JP)

( * ) Notice: Subject to any disclaimer, the term of this patent is extended or adjusted under 35 U.S.C. 154(b) by 355 days.

(21) Appl. No.: 12/452,020

(22) PCT Filed: Aug. 12, 2008

(86) PCT No.: PCT/JP2008/064485
§ 371 (c)(1),
(2), (4) Date: Dec. 11, 2009

(87) PCT Pub. No.: WO2009/025211
PCT Pub. Date: Feb. 26, 2009

(65) Prior Publication Data
US 2010/0134654 A1    Jun. 3, 2010

(30) Foreign Application Priority Data
Aug. 17, 2007   (JP) .................... 2007-212672

(51) Int. Cl.
*H04N 5/76* (2006.01)
(52) U.S. Cl.
USPC .................... 348/231.9; 348/231.99
(58) Field of Classification Search .............. 348/201, 348/247, 248, 267, 231.99, 231.9; 711/151, 711/158, 170–172, 161, 165, 173; 710/13, 710/23, 28, 33, 40
See application file for complete search history.

(56) References Cited

U.S. PATENT DOCUMENTS

| | | | |
|---|---|---|---|
| 6,449,426 B1 | 9/2002 | Suga et al. | |
| 2004/0036780 A1* | 2/2004 | Toba | 348/231.2 |
| 2005/0157338 A1* | 7/2005 | Koike et al. | 358/1.15 |
| 2007/0159658 A1* | 7/2007 | Kato | 358/3.21 |
| 2007/0260579 A1* | 11/2007 | Bae et al. | 707/2 |
| 2008/0062184 A1* | 3/2008 | Maeda | 345/530 |

FOREIGN PATENT DOCUMENTS

| | | | |
|---|---|---|---|
| JP | A-5-103291 | | 4/1993 |
| JP | A-9-322106 | | 12/1997 |
| JP | 2001-223977 | * | 8/2001 |
| JP | A-2001-223977 | | 8/2001 |
| JP | A-2001-231001 | | 8/2001 |
| JP | 2001-245248 | * | 9/2001 |
| JP | A-2001-245248 | | 9/2001 |
| JP | A-2004-229172 | | 8/2004 |

OTHER PUBLICATIONS

International Search Report issued in International Application No. PCT/JP2008/064485; Mailed Nov. 4, 2008.
Japanese Patent Office, Notification of Reasons for Refusal mailed Aug. 7, 2012 in Japanese Patent Application No. 2009-529011 w/English-language Translation.

* cited by examiner

*Primary Examiner* — Lin Ye
*Assistant Examiner* — Euel Cowan
(74) *Attorney, Agent, or Firm* — Oliff & Berridge, PLC

(57) ABSTRACT

A digital camera includes: an imaging unit that obtains image data by capturing an image of a subject; a recording control unit that records the image data obtained by capturing the image of the subject into a plurality of recording media; a speed detection unit that detects access speeds at each of the plurality of recording media; and a selection unit that selects the recording media, into which image data are to be recorded by the recording control unit, based upon each of the access speeds having been detected, wherein: at least one of the plurality of recording media is an exchangeable recording medium.

3 Claims, 13 Drawing Sheets

Figure 1:
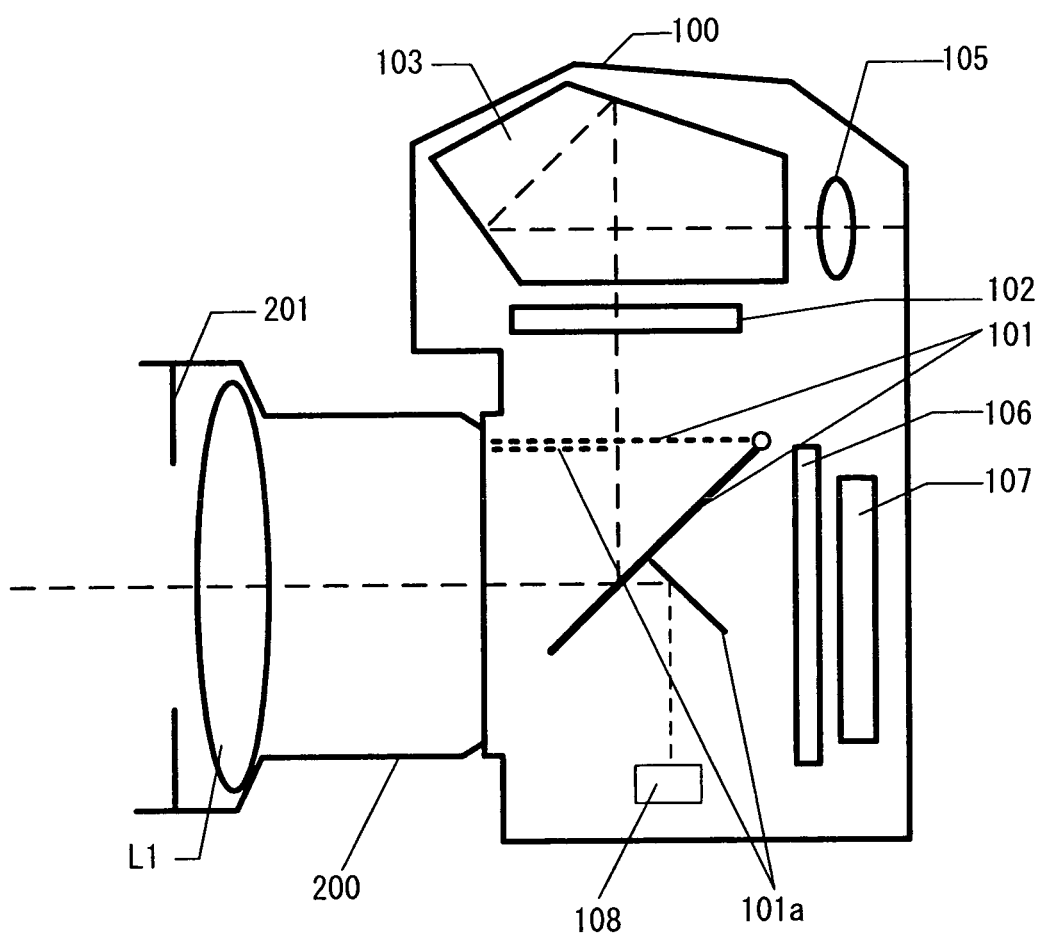

FIG.5
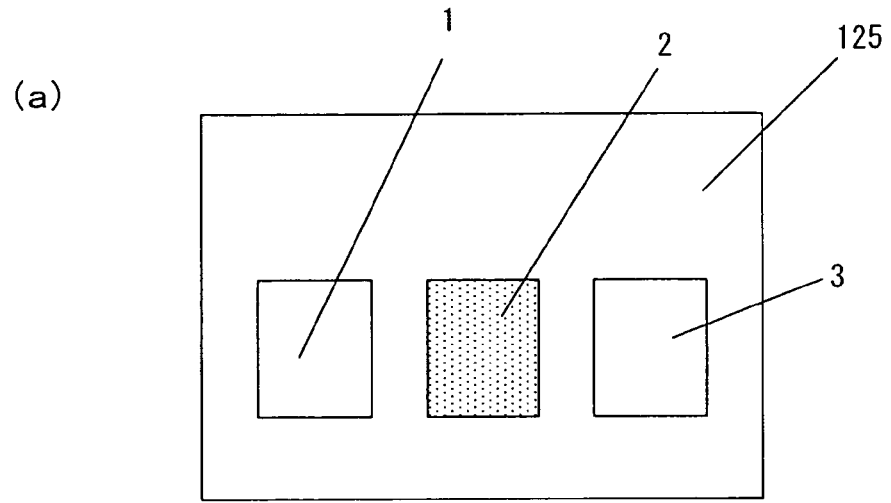
(a)
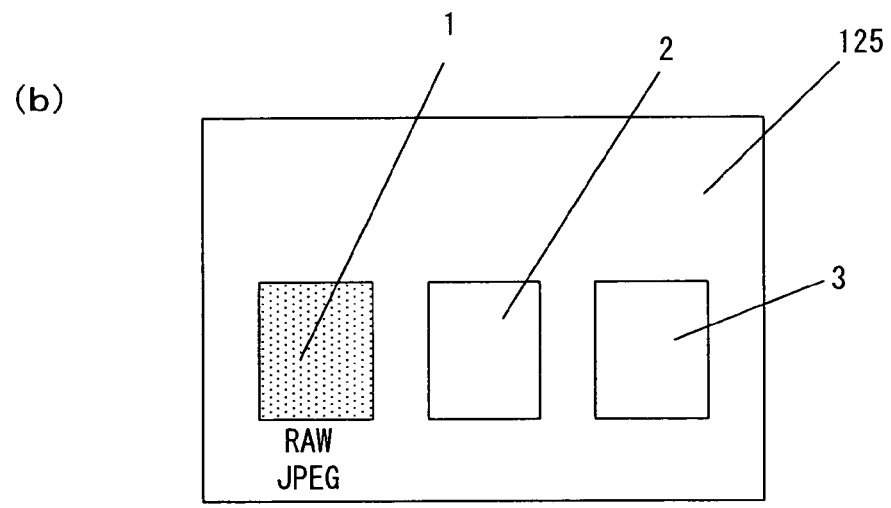
(b)
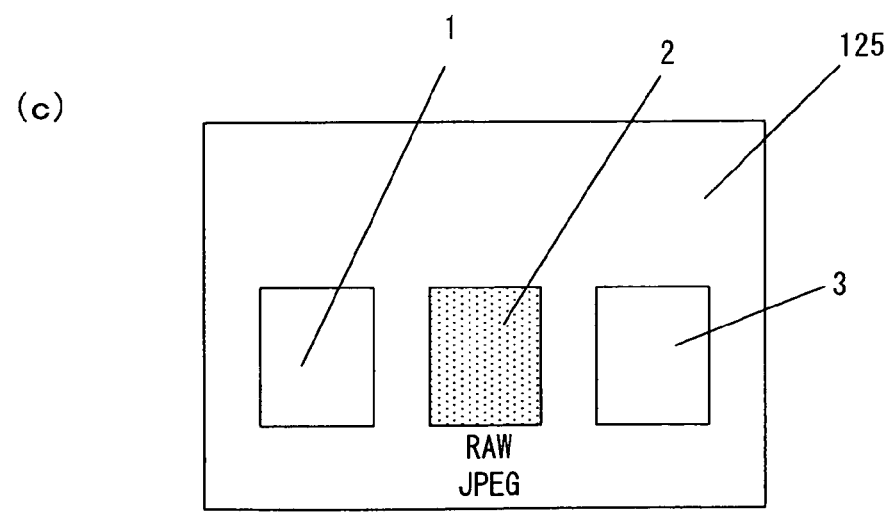
(c)

FIG.10

(a)

| | MEMORY CARD 123c | | MEMORY CARD 123d | | INTERNAL MEMORY 113b | |
|---|---|---|---|---|---|---|
| | SPEED | NINE FRAMES PER SEC | SPEED | THREE FRAMES PER SEC | SPEED | FIVE FRAMES PER SEC |
| | REMAINING CAPACITY | JPEG: 100 FRAMES / RAW: 20 FRAMES | REMAINING CAPACITY | JPEG: 1000 FRAMES / RAW: 200 FRAMES | REMAINING CAPACITY | JPEG: 500 FRAMES / RAW: 100 FRAMES |
| PERFORMANCE PRIORITY MODE | | 1 | | 3 | | 2 |
| PHOTOGRAPH QUANTITY PRIORITY MODE | | 3 | | 1 | | 2 |
| BALANCE MODE FOUR FRAMES PER SEC | | 2 | | 3 | | 1 |
| BALANCE MODE SIX FRAMES PER SEC | | 1 | | 3 | | 2 |
| BALANCE MODE 700 FRAMES | | 3 | | 1 | | 2 |

(b)

| | MEMORY CARD 123c | | MEMORY CARD 123d | | INTERNAL MEMORY 113b | |
|---|---|---|---|---|---|---|
| | SPEED | NINE FRAMES PER SEC | SPEED | THREE FRAMES PER SEC | SPEED | FIVE FRAMES PER SEC |
| | REMAINING CAPACITY | JPEG: 100 FRAMES / RAW: 20 FRAMES | REMAINING CAPACITY | JPEG: 1000 FRAMES / RAW: 200 FRAMES | REMAINING CAPACITY | JPEG: 500 FRAMES / RAW: 100 FRAMES |
| PERFORMANCE PRIORITY MODE | | 1 (RAW) | | 2 | | 1 (JPEG) |
| PHOTOGRAPH QUANTITY PRIORITY MODE | | 2 | | 1 (RAW) | | 1 (JPEG) |
| BALANCE MODE FOUR FRAMES PER SEC | | 1 (JPEG) | | 2 (RAW, JPEG) | | 1 (RAW) |
| BALANCE MODE SIX FRAMES PER SEC | | 1 (RAW, JPEG) | | 3 (RAW, JPEG) | | 2 (RAW, JPEG) |
| BALANCE MODE 200 FRAMES | | | | 1 (RAW) | | 2 (JPEG) |

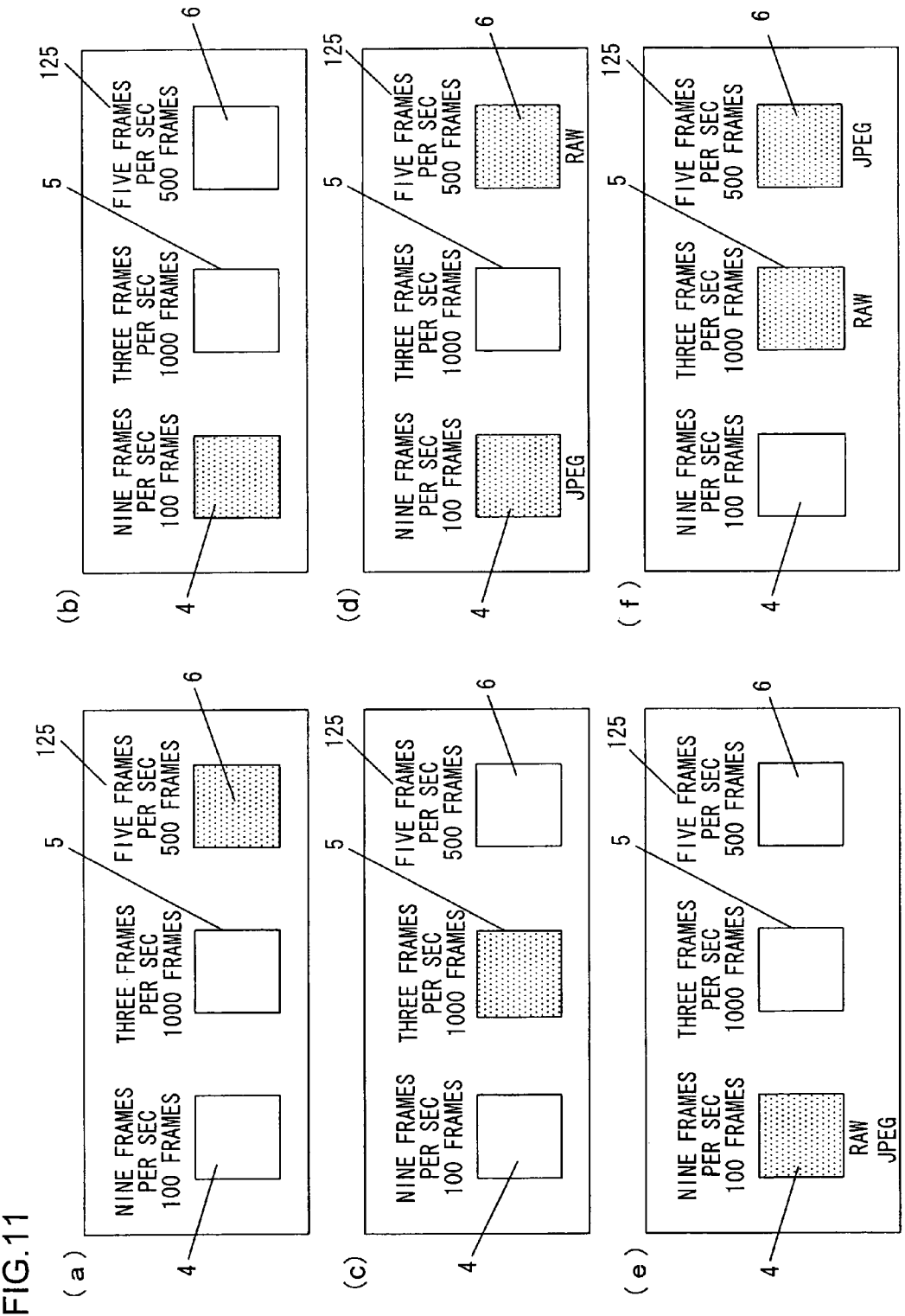

FIG.12

| | MEMORY CARD 123c | | MEMORY CARD 123d | | INTERNAL MEMORY 113b | |
|---|---|---|---|---|---|---|
| | SPEED<br>SIX FRAMES PER SEC | REMAINING CAPACITY<br>JPEG : 10 FRAMES<br>RAW : 2 FRAMES | SPEED<br>SIX FRAMES PER SEC | REMAINING CAPACITY<br>JPEG : 1000 FRAMES<br>RAW : 200 FRAMES | SPEED<br>FOUR FRAMES PER SEC | REMAINING CAPACITY<br>JPEG : 3000 FRAMES<br>RAW : 600 FRAMES |
| PERFORMANCE PRIORITY MODE | 2 | | 1 | | 3 | |
| PHOTOGRAPH QUANTITY PRIORITY MODE | 3 | | 2 | | 1 | |
| BALANCE MODE — SPEED SETTING | 2 | | 1 | | 3 | |
| BALANCE MODE — QUANTITY SETTING | 3 | | 2 | | 1 | |

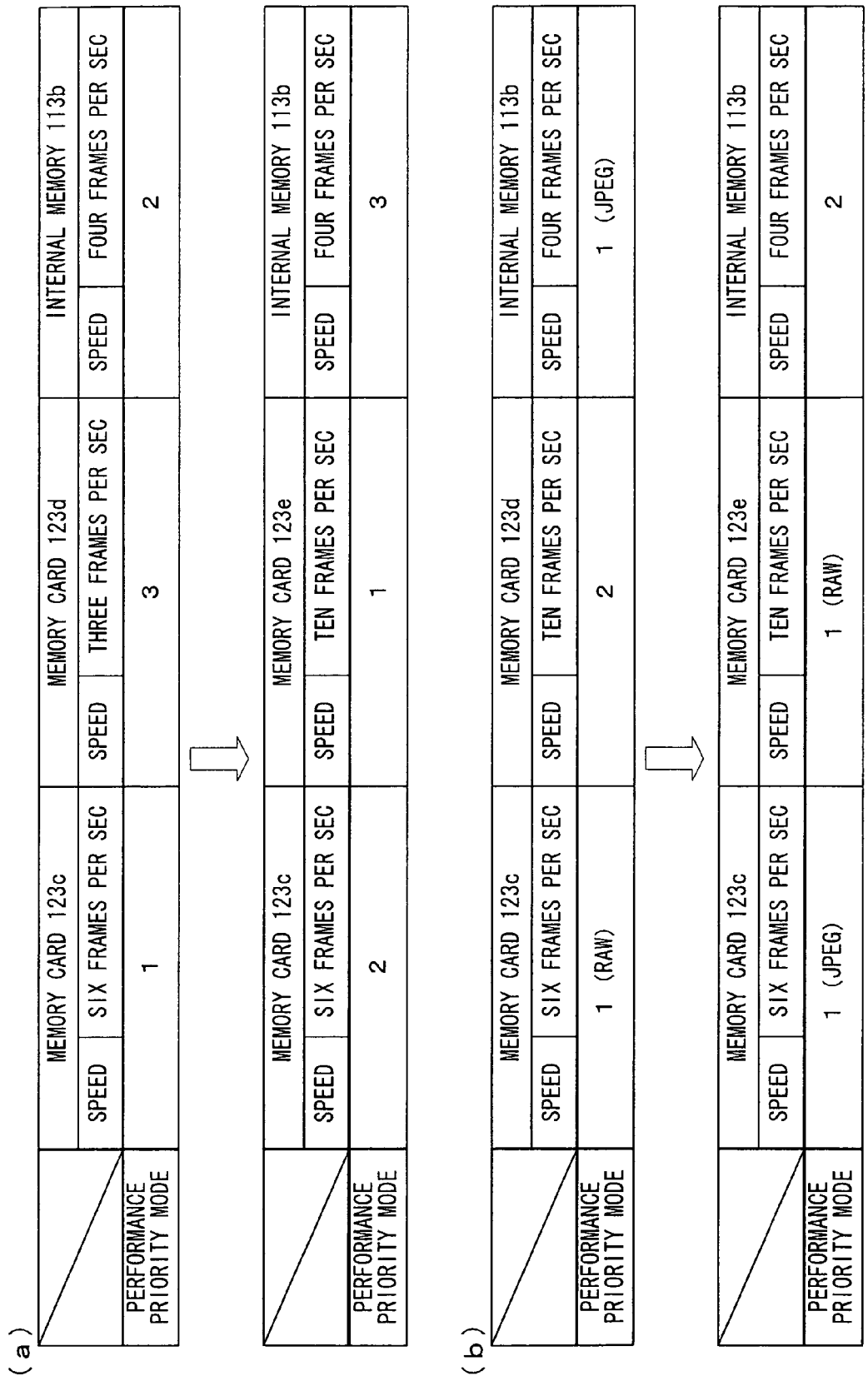

DIGITAL CAMERA

TECHNICAL FIELD

The present invention relates to a digital camera capable of recording image data into a plurality of recording media.

BACKGROUND ART

There are cameras known in the related art that allow a plurality of recording media to be inserted therein (see, for instance, patent reference 1)
patent reference 1: Japanese Laid Open Patent Publication No. H5-103291

DISCLOSURE OF THE INVENTION

Problems to be Solved by the Invention

However, when the write speed varies from one recording medium to another among the plurality of recording media, it may take a significant length of time to execute write processing depending upon the write speed of the recording medium and the volume of image data to be written, all the while suspending any subsequent photographing processing.

Means for Solving the Problems

According to the 1st aspect of the present invention, a digital camera comprises: an imaging unit that obtains image data by capturing an image of a subject; a recording control unit that records the image data obtained by capturing the image of the subject into a plurality of recording media; a speed detection unit that detects access speeds at each of the plurality of recording media; and a selection unit that selects the recording media, into which image data are to be recorded by the recording control unit, based upon each of the access speeds having been detected, wherein: at least one of the plurality of recording media is an exchangeable recording medium.

According to the 2nd aspect of the present invention, it is preferred that the digital camera according to the 1st aspect further comprises: a processing unit that generates a plurality of sets of image data by processing the image data having been obtained via the imaging unit; and a size detection unit that detects data sizes of each of the plurality of sets of image data, wherein: the selection unit individually selects the recording media into which the plurality of sets of image data are to be recorded in correspondence to the data sizes having been detected.

According to the 3rd aspect of the present invention, it is preferred that in the digital camera according to the 2nd aspect, the processing unit includes a compression unit that executes compression processing on the image data so as to reduce a data size of the image data; the processing unit generates first image data created by engaging the compression unit in execution of the compression processing on the image data and second image data created without executing the compression processing on the image data; and the data size of the first image data and the data size of the second image data are different from each other.

According to the 4th aspect of the present invention, it is preferred that in the digital camera according to the 2nd aspect, the processing unit includes an image processing unit that executes image processing on image data; the processing unit generates first image data created by engaging the image processing unit in execution of the image processing on the image data and second image data created without executing the image processing on the image data; and the data size of the first image data and the data size of the second image data are different from each other.

According to the 5th aspect of the present invention, it is preferred that in the digital camera according to any one of the 2nd through 4th aspects, the selection unit selects the recording media so that the recording control unit records image data with a larger data size into a recording medium with a higher access speed and records image data with a smaller data size into a recording medium with a lower access speed.

According to the 6th aspect of the present invention, it is preferred that in the digital camera according to any one of the 2nd through 5th aspects, the plurality of recording media includes more than or equal to three recording media; and when the recording control unit is to record image data into more than or equal to three recording media, the selection unit selects the recording media so that image data with a largest data size are recorded into a recording medium with a highest access speed.

According to the 7th aspect of the present invention, it is preferred that the digital camera according to the 1st aspect further comprises: a processing unit that generates a plurality of sets of image data by processing the image data having been obtained via the imaging unit, wherein: when access speeds at the recording media are different from one another, the selection unit selects the recording media so that the recording control unit records the plurality of sets of image data into a recording medium with a highest access speed.

According to the 8th aspect of the present invention, it is preferred that the digital camera according to the 1st aspect further comprises: a processing unit that generates a plurality of sets of image data by processing the image data having been obtained via the imaging unit; and a read unit that reads out image data recorded in the recording media, wherein: when the plurality of sets of image data are recorded in the plurality of recording media, the read unit reads out the image data from a recording medium with a highest access speed.

According to the 9th aspect of the present invention, it is preferred that the digital camera according to the 1st aspect further comprises: a remaining capacity detection unit that detects remaining capacities at the plurality of recording media, wherein: the selection unit selects the recording media into which the image data are to be recorded based upon the access speeds and the remaining capacities having been detected by the remaining capacity detection unit.

Effect of the Invention

According to the present invention, a specific recording medium into which image data are to be recorded is selected based upon the access speeds at the individual recording media, allowing the ongoing photographing operation to be continuously executed even when the data size of the image data is large.

BRIEF DESCRIPTION OF THE DRAWINGS (FIG. 1) The essential structure of the electronic camera achieved in an embodiment of the present invention;

(FIG. 2) A block diagram of the control system in the electronic camera achieved in the embodiment;

(FIG. 3) An example of a display that may be brought up on the sub-display unit in a first embodiment;

(FIG. 4) A flowchart of the recording medium selection processing executed in the first embodiment;

(FIG. 5) Examples of displays that may be brought up on the sub-display unit in a second embodiment;

(FIG. 6) A flowchart of the recording medium selection processing executed in the second embodiment;

(FIG. 7) An example of a display that may be brought up on the sub-display unit in a third embodiment;

(FIG. 8) A flowchart of the recording medium selection processing executed in the third embodiment;

(FIG. 9) A block diagram of the control system in the electronic camera achieved in a fourth embodiment;

(FIG. 10) Priority rankings assigned to recording media in the fourth embodiment;

(FIG. 11) Examples of displays that may be brought up on the sub-display unit in the fourth embodiment;

(FIG. 12) Priority rankings assigned to recording media in the fourth embodiment;

(FIG. 13) Priority rankings assumed in the event of recording medium replacement.

BEST MODE FOR CARRYING OUT THE INVENTION

First Embodiment

In reference to FIGS. 1 through 4, the electronic camera achieved in the first embodiment of the present invention is described. FIG. 1 shows the essential structure of an electronic camera 100. An interchangeable lens 200, which includes a photographic lens L1 and an aperture 201, can be detachably mounted at the body of the electronic camera 100. A quick return mirror 101, a reticle 102, a pentaprism 103, an eyepiece lens 105, a shutter 106, an image sensor 107 and a focus detection sensor 108 are disposed at the body of the camera 100.

Figure 2:
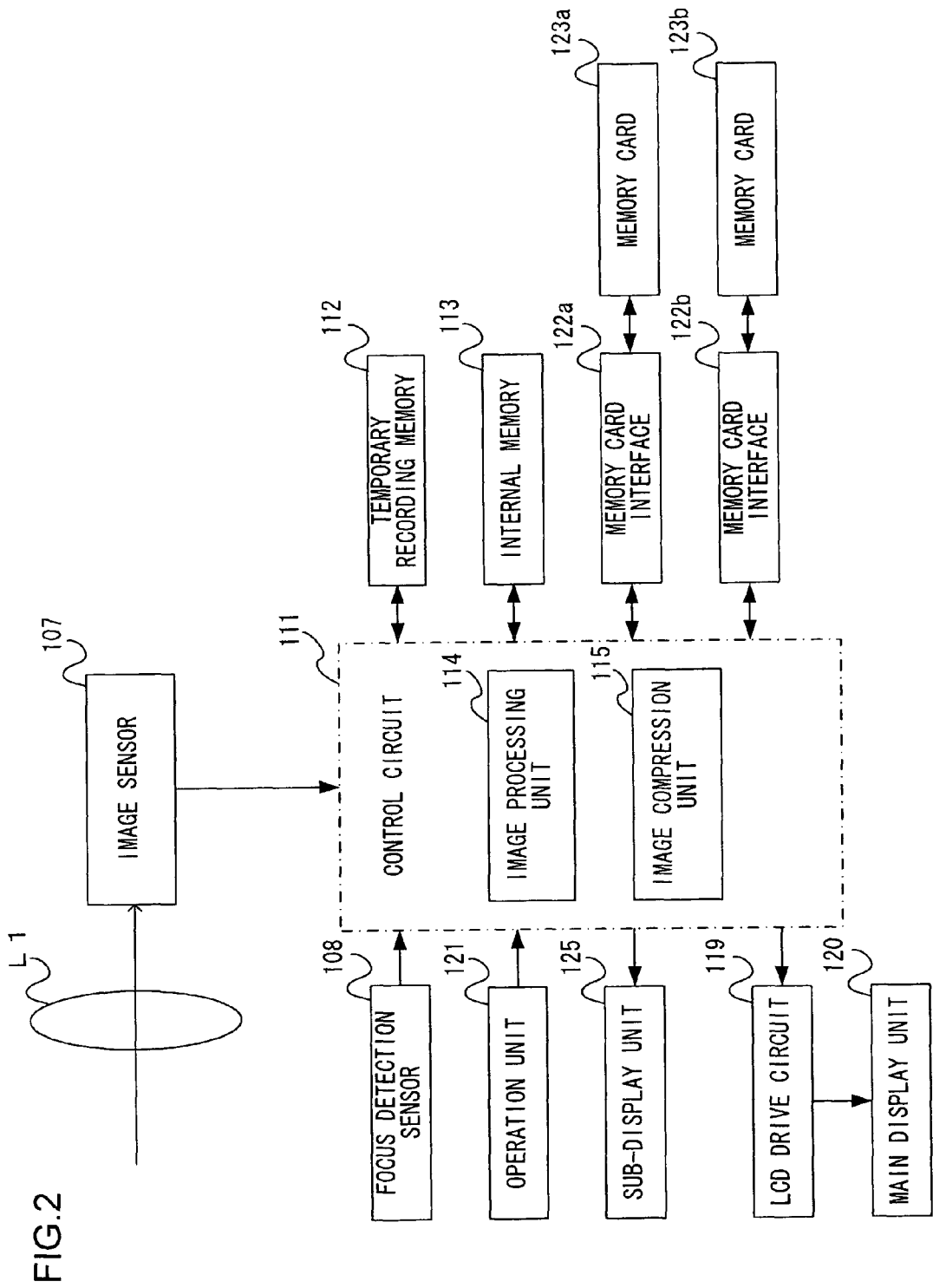

FIG. 2 is a block diagram of the control system in the electronic camera 100. In FIG. 2, the same reference numerals are assigned to components shown in FIG. 1. The control system in the electronic camera 100 includes the image sensor 107, the focus detection sensor 108, a control circuit 111, a temporary recording memory 112, an internal memory 113, an LCD drive circuit 119, a main display unit 120, an operation unit 121, card interfaces 122a~122b, memory cards 123a~123b and a sub-display unit 125.

To resume the description given reference to FIG. 1, subject light having passed through the interchangeable lens 200 and having entered the electronic camera 100 is guided upward via the quick return minor 101 assuming the position indicated by the solid line in FIG. 1 prior to a shutter release and forms an image on the reticle 102. The subject light also enters the pentaprism 103. The subject light having entered the pentaprism 103 is guided via the pentaprism towards the eyepiece lens 105. Part of the subject light is transmitted through a semi-transmissive area at the quick return mirror 101, is reflected downward at a sub-mirror 101a and then enters the focus detection sensor 108.

Following the shutter release, the quick return mirror 101 swings to the position indicated by the dotted line in FIG. 1, the subject light is guided via the shutter 106 to the image sensor 107 and the subject image is formed on the imaging surface of the image sensor 107. The image sensor 107 is a photoelectric conversion element such as a CCD sensor or a CMOS sensor that converts the received subject light to image signals corresponding to the subject light intensity.

The control system is described in further detail in reference to FIG. 2.

The image sensor 107 outputs image signals in response to a timing signal output by the control circuit 111. The control circuit 111, which includes a CPU, a ROM and a RAM (not shown), is an arithmetic operation circuit that controls the individual components of the electronic camera 100 and executes various types of data processing. The control circuit 111 first executes analog processing on the image signals output from the image sensor 107 and then converts the image signals having undergone the analog processing to digital image data.

The control circuit 111 includes an image processing unit 114 and an image compression unit 115. The image processing unit 114 executes image processing such as white balance processing, gamma correction processing, color interpolation processing, edge enhancement processing and vignetting correction processing on the image data. The image compression unit 115 is a circuit that executes JPEG compression processing on the main image data having undergone the image processing at the image processing unit 114.

The temporary recording memory 112 is a volatile memory used to temporarily store data currently undergoing the image processing, the image compression processing or display data generation processing and data resulting from the image processing, the image compression processing and the display data generation processing. The internal memory 113 is a non-volatile memory where image data having undergone the image processing and the like described above are recorded.

The memory card interfaces 122a and 122b are interfaces at which the memory cards 123a and 123b are detachably loaded. Upon detecting the presence of the memory cards 123a and 123b, the respective memory card interfaces output a detection signal to the control circuit 111. At the memory card interfaces 122a and 122b, image data temporarily stored in the temporary recording memory 112 are written into the memory cards 123a and 123b and image data recorded in the memory cards 123a and 123b are read out under control executed by the control circuit 111. The memory cards 123a and 123b are each a semiconductor memory card such as a compact flash (registered trademark) or an SD card.

The LCD drive circuit 119 drives the main display unit 120 based upon an instruction issued by the control circuit 111. At the main display unit 120, which may be constituted with, for instance, a liquid crystal display panel, display data generated by the control circuit 111 based upon image data recorded in the internal memory 113, the memory card 123a or the memory card 123b are brought up on display in a reproduction mode. In addition, a menu screen is brought up on display at the main display unit 120 so as to allow the user of the electronic camera 100 to set various operations. The settings displayed in the menu screen include an image quality mode in correspondence to which a specific level of photographic image quality is selected. The image quality mode setting that can be selected in the menu screen may include, for instance, a normal setting, a fine setting, a raw setting, a raw+fine setting and a raw+normal setting. Image data obtained at the normal setting or the fine setting undergo JPEG compression processing at the control circuit 111 as explained earlier. If a plurality of sets of image data at varying image quality levels are obtained in correspondence to a given subject, as in the raw+fine setting or the raw+normal setting, the plurality of sets of image data can be recorded into different recording media.

The operation unit 121 is constituted with switches functioning as a user operation interface. The operation unit 121 includes a power switch, a shutter release switch and other switches and buttons such as a settings menu display changeover switch and a settings menu OK button. An operation mode for the electronic camera 100, a photographic image size (L, M or S), the photographic image quality level mentioned above, and the like can be selected via the operation unit 121. A single-shot mode, a continuous shooting mode, a reproduction mode or the like may be selected as the operation mode of the electronic camera 100.

The sub-display unit 125, disposed at the top surface of the body of the electronic camera 100 may be constituted with a liquid crystal display panel. Information indicating the currently selected operation mode and image quality mode setting, the recording medium currently used for photographic image recording and the like is displayed at the sub-display unit 125.

An image quality mode setting such as the raw+normal setting, at which image data are recorded at two different image quality levels is now described. The control circuit 111 records the raw data and the image data having undergone the compression processing into two media among the memory cards 123*a* and 123*b* and the internal memory 113 with varying access speeds. The recording medium selection processing executed by the control circuit 111 in this situation is now explained. The embodiment is described by assuming that the access speed of the memory card 123*a*, i.e., the data write/read speed at the memory card 123*a* is set in compliance with, for instance, the UDMA mode2 (33.3 Mb/s), that the access speed of the memory card 123*b* is set in compliance with the PIO mode6 (25 Mb/s) and that the access speed of the internal memory 113 is set in compliance with the PIO mode2 (8.33 Mb/s). The UDMA and the PIO are standards set forth in relation to data transmission and the relevant access speeds are written in specific areas within the respective recording media, i.e., the internal memory 113 and the memory cards 123*a* and 123*b*. The access speeds are set in the PIO standards in correspondence to modes 0~6, and the write/read speed increases in ascending order from mode 0 to mode 6. In addition, data can be transmitted faster through the UDMA method compared to the PIO method.

Once the memory cards 123*a* and 123*b* are loaded, the control circuit 112 reads the respective access speeds, i.e., the respective write speeds, set in compliance with the data transmission standards corresponding to the memory cards 123*a* and 123*b*, via the card interfaces 122*a* and 122*b*. Then, based upon the write speeds having been read, the control circuit 111 assigns priority rankings to the internal memory 113 and the memory cards 123*a* and 123*b* in relation to their write speeds. Namely, the control circuit 111 in the embodiment gives priority rankings in the order of, the memory card 123*a*, the memory card 123*b* and the internal memory 113.

Based upon the image quality level or size selected as the image quality mode setting, the control circuit 111 estimates the data size of each type of image data to be recorded and ranks various data sizes. The data size of a set of raw data may be, for instance, 18 MB, whereas the data size of a set of image data at normal image quality may be, for instance, 3 MB. Accordingly, the control circuit 111 ranks the data size in the order of raw data and image data at the normal image quality level. It is to be noted that correspondence data indicating the correspondence between the image quality levels and the data sizes are recorded in advance in a specific recording area and the control circuit 111 references these correspondence data whenever data sizes need to be ranked.

Once the priority rankings for the internal memory 113 and the memory cards 123*a* and 123*b* are set and the data sizes are ranked, the control circuit 111 selects a recording medium among the internal memory 113 and the memory cards 123*a* and 123*b* and assigns the selected recording medium as an image data recording location. The control circuit 111 selects the recording media so as to record the high ranked data, i.e., the raw data, into the memory card 123*a* with the highest priority ranking and record the low ranked data, i.e., the image data at normal image quality, into the memory card 123*b* with the second highest priority ranking. As a result, the image data with the larger data size can be recorded into the memory card 123*a* with the higher write speed.

Figure 3:
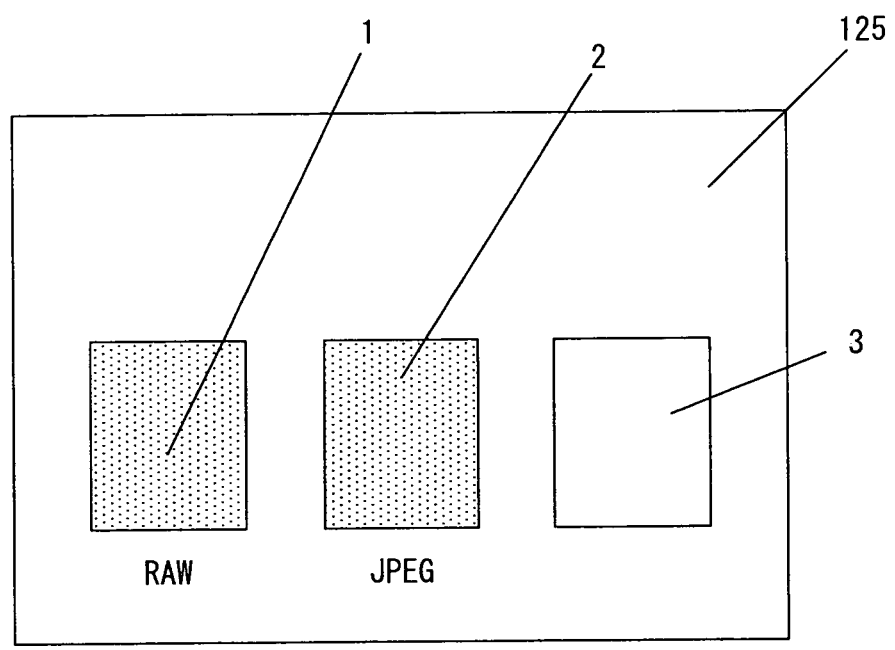

Once the recording media where the image data are to be recorded have been designated, the control circuit 111 brings up on display at the sub-display unit 125 the correspondence between the image data quality levels and the recording media having been designated as the recording locations, as shown in FIG. 3. In FIG. 3, a rectangle 1 represents the memory card 123*a* a rectangle 2 represents the memory card 123*b* and a rectangle 3 represents the internal memory 113. It is to be noted that recording media may be indicated by a shape other than a rectangle.

As described above, the memory card 123*a* is designated as the raw data recording location and accordingly, a "RAW" mark indicating that raw data are to be recorded therein is displayed under the rectangle 1 at the sub-display unit 125. In addition, the rectangle 1 is brought up as a hyperchromic display. Likewise, the memory card 123*b* is designated as the normal-quality image data recording location and accordingly, a "JPEG" mark indicating that image data at normal image quality having been compressed in the JPEG format, are to be recorded therein is displayed under the rectangle 2 at the sub-display unit 125. The rectangle 2 is also brought up as a hyperchromic display. Since the internal memory 113 is not designated as an image data recording location, the corresponding rectangle 3 is brought up as a hypochromic display at the sub-display unit 125.

If the remaining capacity in the memory card 123*a* becomes less than that required for raw data recording while the image data are being recorded into the memory cards 123*a* and 123*b*, the control circuit 111 alters the recording media designations through either of the following two methods. It is to be noted that the user is able to select either of the following two methods by operating the operation unit 121.

1. Designate the memory card 123*b* as the raw data recording location and the internal memory 113 as the recording location for normal-quality image data (JPEG).
2. Designate the internal memory 113 as the raw data recording location and sustain the designation of the memory card 123*b* as the recording location for normal-quality image data (JPEG).

In method 1 described above, the image data with the larger data size can be recorded into a faster recording medium with the higher write speed. The user having selected method 2, on the other hand, is able to use the memory card 123*b* exclusively as the recording location for image data having been compressed in the JPEG format.

Figure 4:
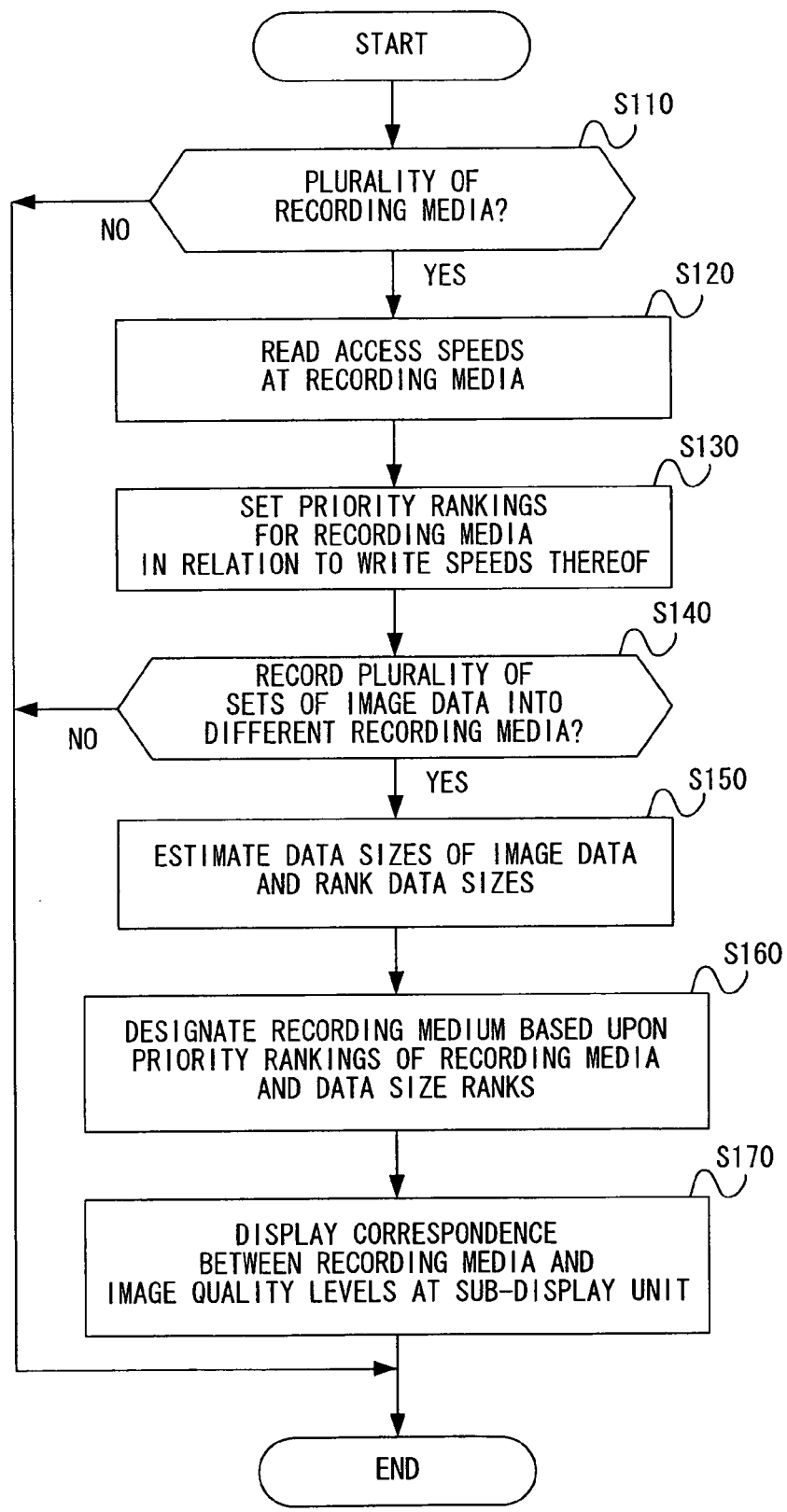

In reference to the flowchart presented in FIG. 4, various processing steps of the recording medium selection operation executed in the electronic camera 100 in the embodiment are described. The processing steps shown in FIG. 4 are executed by the control circuit 111 based upon a program. The program enabling the control circuit to execute the processing steps in FIG. 4, stored in a memory (not shown), is started up as a power ON signal is input from the power switch or as a detection signal originating from the memory card interface 122*a* or 122*b* is input.

In step S110, a decision is made as to whether or not a plurality of recording media are present, i.e., whether or not at least either the memory card 123*a* or the memory card 123*b*, in addition to the internal memory 113, is loaded. If a plurality of recording media are present, i.e., if a detection signal is input from at least either the memory card interface 122*a* or the memory card interface 122*b*, an affirmative decision is made in step S110 and the operation proceeds to step S120. If no detection signal is input from the memory card interfaces 122a and 122b, i.e., if only one recording medium is present, a negative decision is made in step S110 and the sequence of processing ends.

In step S120, the write speeds at the internal memory 113, the memory card 123a and the memory card 123b, set in compliance with the respective data transmission standards, are read, before the operation proceeds to step S130. In step S130, the priority rankings are set for the internal memory 113 and the memory cards 123a and 123b in relation to their write speeds based upon the write speeds having been read in step S120 and then the operation proceeds to step S140.

In step S140, a decision is made as to whether or not a setting for recording a plurality of sets of image data obtained by photographing a single subject into a plurality of different recording media has been selected. If an image quality mode setting, such as the raw+fine mode setting or the raw+normal mode setting, for recording a plurality of sets of image data corresponding to the same subject into a plurality of different recording media has been selected, an affirmative decision is made in step S140 and the operation proceeds to step S150. If, on the other hand, an image quality mode setting such as the fine mode setting or the normal mode setting, in which the image data are not recorded into a plurality of recording media, is on, a negative decision is made in step S140 and the sequence of processing ends.

In step S150, the data sizes of the image data to be recorded are estimated in correspondence to the image quality levels selected as the image quality mode setting and the data sizes are ranked before the operation proceeds to step S160. In step S160, recording media are designated as image data recording locations based upon the priority rankings having been given to the various recording media in step S130 in relation to their write speeds and the image data sizes having been ranked in step S140. Namely, recording media are designated so as to record the image data with the larger data size into the recording medium with a higher write speed and then the operation proceeds to step S170. In step S170, the correspondence between the designated recording media and the image quality levels is indicated on display at the sub-display unit 125 and then the sequence of processing ends.

The following advantages are achieved through the first embodiment described above.

(1) The control circuit 111 selects a recording medium where data are to be recorded based upon the access speeds at the internal memory 113 and the exchangeable, i.e., detachable, memory cards 123a and 123b. Thus, when a plurality of recording media with varying write speeds are present, image data can be recorded into the fastest recording medium with the highest write speed so as to improve the recording processing capability of the electronic camera 100 by securing a sufficient memory capacity at the temporary recording memory 112 during photographing operation.

(2) The control circuit 111 selects recording media so as to record the 18 MB raw data in an uncompressed state into the memory card 123a and record the 3 MB image data having been compressed in the JPEG format into the memory card 123b. Namely, when recording a plurality of sets of image data corresponding to a single subject, the control circuit 111 detects the data sizes of the individual sets of image data and records the image data with the higher ranked data size into the recording medium with the higher priority ranking with regard to its write speed. As a result, since bottleneck conditions, in which the temporary recording memory 112 becomes full and the photographing operation can no longer be executed while the write of raw data with the large data size into the slower memory card 123b or the internal memory 113 with the low write speed is in progress, are prevented, the user does not miss a good photo opportunity.

(3) The control circuit 111 detects the data size of each set of image data and records the image data with the largest data size into the recording medium with the highest write speed. As a result, a higher write speed per unit byte is assured for image data with a greater data size, which makes it possible to reduce the length of time required for the recording processing.

The electronic camera 100 in the first embodiment allows for the following variations.

(1) The control circuit 111 may select recording media into which a plurality of sets of video data are to be recorded based upon the data sizes of the video data and the access speeds at the recording media. For instance, when recording color video data and monochrome video data with different data sizes, the control circuit 111 may record the color video data with the larger data size into the memory card 123a and record the monochrome video data with the smaller data size into the memory card 123b. In addition, the control circuit 111 may record HDV (high-definition video) with a data size larger than that of VGA data, into the memory card 123a and the VGA data with the smaller data size into the memory card 123b.

(2) Instead of ranking the data sizes based upon whether or not each set of image data has been compressed, the data size may be ranked based upon whether or not each set of image data has undergone image processing. In the latter case, assuming that the raw+normal image quality mode setting has been selected, the raw data which have not undergone the image processing, assume a larger data size and the normal-quality image data, which have undergone the image processing, assume a smaller data size. Accordingly, based upon whether or not the individual sets of image data have undergone the image processing, the control circuit 111 may rank the raw data higher than the normal-quality image data and record the image data with the data size thereof ranked higher into the recording medium with the higher priority ranking with regard to the write speed thereof.

Second Embodiment

Figure 6:
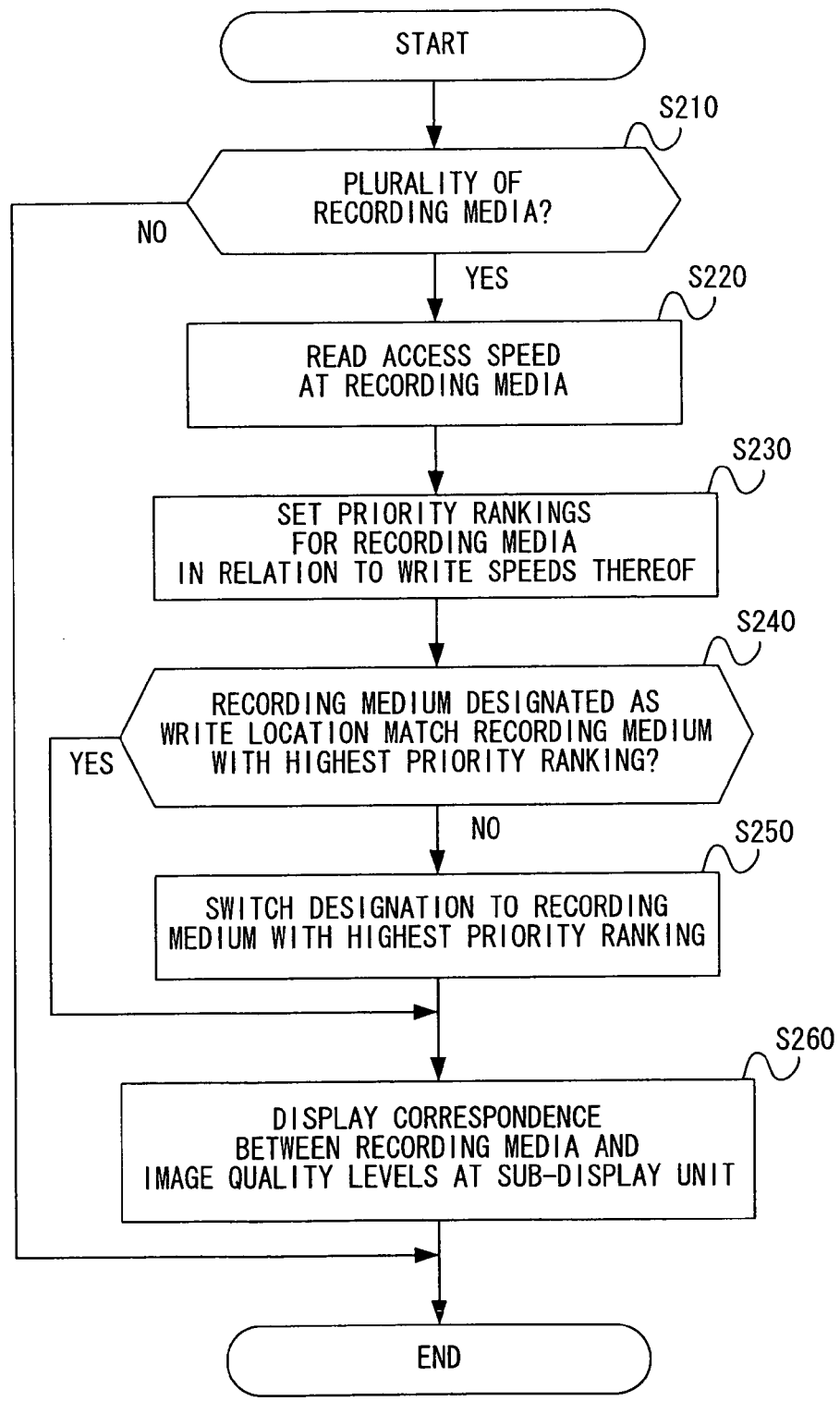

In reference to FIGS. 5 and 6, the second embodiment of the electronic camera according to the present invention is now described. The same reference numerals are assigned to components identical to those of the first embodiment and the following description focuses on the difference from the first embodiment. Unless specially noted, the second embodiment is identical to the first embodiment. The embodiment differs from the first embodiment in that when a plurality of sets of image data with varying image quality levels are obtained in correspondence to a single subject, as in the raw+fine mode or the raw+normal mode, the plurality of sets of image data are recorded into a single recording medium.

In addition, the recording medium into which image data are to be written can be specified by the user by operating the operation unit 121 in the second embodiment. FIG. 5(a) presents an example of a display that may be brought up at the sub-display unit 125 when the memory card 123b is designated as the write location. In FIG. 5, a rectangle 1 represents the memory card 123a, a rectangle 2 represents the memory card 123b and a rectangle 3 represents the internal memory 113. It is to be noted that recording media may be indicated by a shape other than a rectangle. In FIG. 5(a), the rectangle 2 corresponding to the memory card 123b having been specified as the write location is presented as a hyperchromic display and the rectangles 1 and 3 corresponding to the memory card 123*a* and the internal memory 113, neither of which has been designated as a write location, are presented in a hypochromic display.

When image data assuming two different image quality levels are obtained at a certain image quality mode setting such as the raw+normal image quality mode setting, the control circuit 111 records the raw data, which have not undergone compression processing, and the compressed image data into a common recording medium. As in the first embodiment, the control circuit 111 reads the write speeds at the internal memory 113 and the memory cards 123*a* and 123*b*, set forth in conformance with the respective data transmission standards. The control circuit 111 then assigns priority rankings to the internal memory 113 and the memory cards 123*a* and 123*b* in relation to their write speeds based upon the write speeds having been read. Namely, the control circuit 111 sets the priority rankings in the order of the memory card 123*a*, the memory card 123*b* and the internal memory 113.

Upon giving priority rankings to the recording media in relation to their write speeds, as described above, the control circuit 111 makes a decision as to whether or not the recording medium having been specified by the user as the write location is the recording medium with the highest priority ranking. If the memory card 123*a* has been specified by the user as the write location, the control circuit 111 ensures that the image data are recorded into the memory card 123*a* without altering the recording medium designation. However, if the memory card 123*b* or the internal memory 113 has been specified as the write location, the control circuit 111 alters the recording medium designation and ensures that the image data are recorded into the memory card 123*a*.

Once a specific memory card has been designated as the image data recording location, the control circuit 111 indicates on display at the sub-display unit 125 the correspondence between the image data quality levels and the recording medium having been designated as the recording location, as shown in FIG. 5(*b*). The memory card 123*a* is designated as the image data recording location and accordingly, a "RAW" mark indicating that raw data are to be recorded therein and a "JPEG" mark indicating that the normal-quality image data having undergone JPEG compression are to be recorded therein are displayed under the rectangle 1 at the sub-display unit 125. In addition, the rectangle 1 is brought up as a hyperchromic display. Since neither the memory card 123*b* nor the internal memory 113 has been designated as an image data recording location, the corresponding rectangles 2 and 3 are presented as hypochromic displays at the sub-display unit 125.

If the remaining capacity available at the memory card 123*a* becomes less than that required for the image data recording while the image data are being recorded into the memory card 123*a* with the highest priority ranking, the control circuit 111 switches the recording medium designation to the memory card 123*b* with the second highest priority ranking. Once the recording medium designation has been switched, the control circuit 111 indicates on display at the sub-display unit 125 the correspondence between the image data quality levels and the recording medium having been designated as the recording location, as shown in FIG. 5(*c*). Namely, the "RAW" mark and the "JPEG" mark are displayed under the rectangle 2 corresponding to the memory card 123*b* at the sub-display unit 125. In addition, the rectangle 2 is brought up as a hyperchromic display. Since neither the memory card 123*a* nor the internal memory 113 has been designated as an image data recording location, the corresponding rectangles 1 and 3 are presented as hypochromic displays at the sub-display unit 125.

In reference to the flowchart presented in FIG. 6, various processing steps of the recording medium selection processing executed in the electronic camera 100 in the embodiment are described. The processing steps shown in FIG. 6 are executed by the control circuit 111 based upon a program. The program enabling the control circuit to execute the processing steps in FIG. 6, stored in a memory (not shown), is started up as a power ON signal is input from the power switch or as a detection signal originating from the memory card interface 122*a* or 122*b* is input.

The processing executed in step S210 (making a decision as to whether or not a plurality of recording media are present) through step S230 (giving priority rankings to the recording media) is identical to the processing executed in step S110 (making a decision as to whether or not a plurality of recording media are present) through step S130 (giving priority rankings to the recording media) in FIG. 4. In step S240, a decision is made as to whether or not the recording medium having been specified by the user as the write location is the recording medium having been given the highest priority ranking in step S230. An affirmative decision is made in step S240 if the recording medium having been specified by the user as the write location is the recording medium with the highest priority ranking, and the operation proceeds to step S260 in this case.

If the recording medium having been specified by the user as the write location is not the recording medium with the highest priority ranking, however, a negative decision is made in step S240 and the operation proceeds to step S250. In step S250, the designation is switched so as to record the image data into the recording medium having been awarded the highest priority ranking in step S230 and then the operation proceeds to step S260. In step S260, the correspondence between the designated recording medium and the image quality levels is indicated on display at the sub-display unit 125 before ending the sequence of processing.

In addition to the advantages of the first embodiment, the following advantage is achieved through the second embodiment described above.

The control circuit 111 records the raw data and the image data having been compressed in the JPEG format, both corresponding to the same subject, into the memory card 123*a* having been detected as the recording medium with the highest access speed. Thus, since bottleneck conditions attributable to a low write speed at the recording medium, which may result in the temporary recording memory 112 becoming full to disable the ongoing photographing operation, are prevented, the processing performance of the electronic camera 100 is improved.

It is to be noted that in the electronic camera 100 achieved in the second embodiment, too, a plurality of sets of movie data with varying data sizes can be recorded into the memory card 123*a*, i.e., the recording medium with the highest access speed.

Third Embodiment

Figure 7:
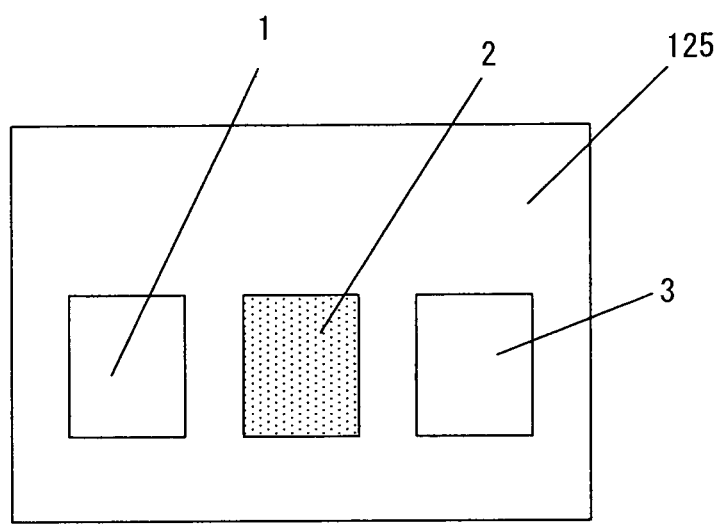
Figure 8:
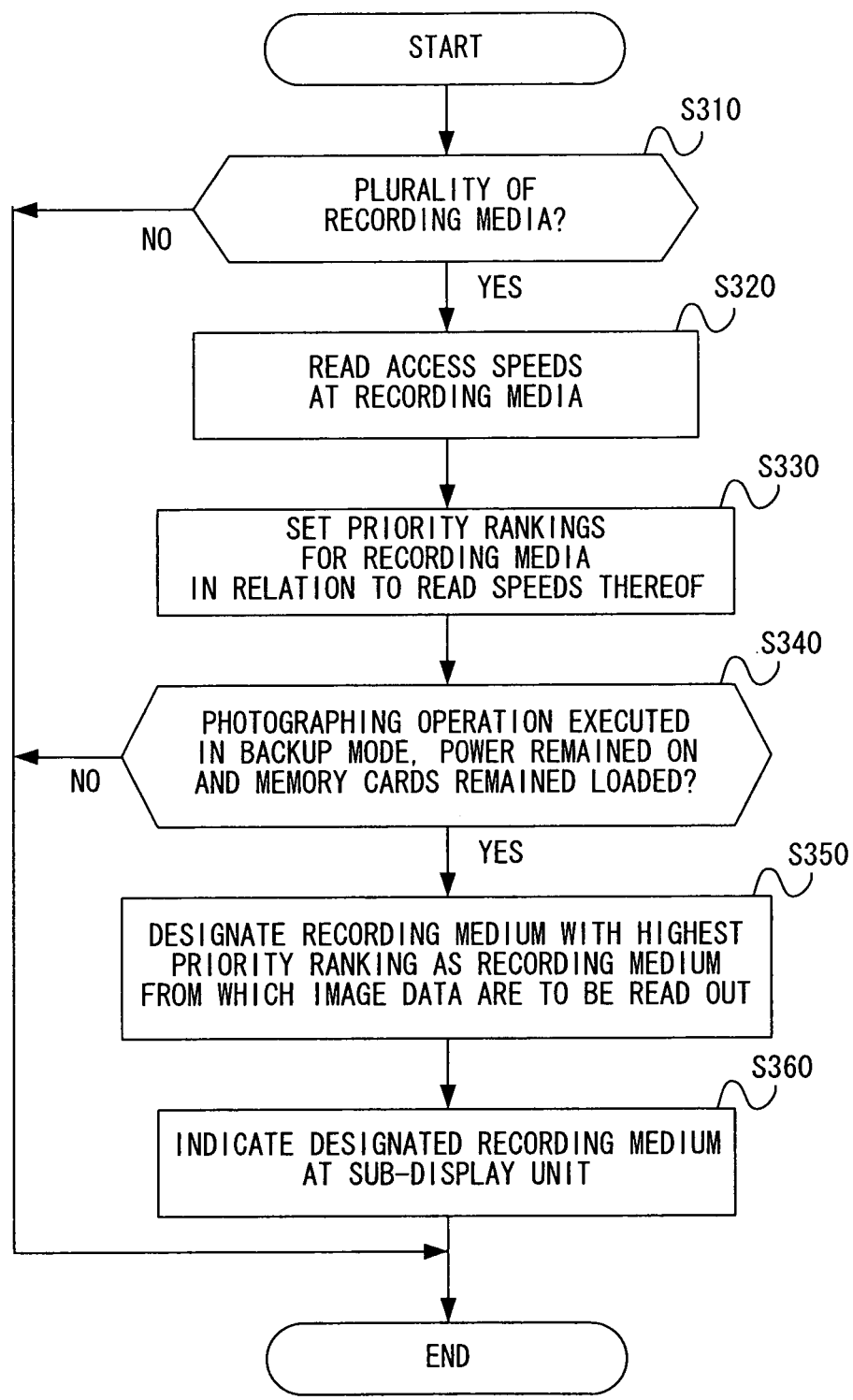

In reference to FIGS. 7 and 8, the third embodiment of the electronic camera according to the present invention is described. The same reference numerals are assigned to components identical to those of the first embodiment and the following description focuses on the difference from the first embodiment. Unless specially noted, the third embodiment is identical to the first embodiment. The embodiment differs from the first embodiment in that it enables backup storage that allows identical image data to be simultaneously recorded into a plurality of recording media. The third embodiment is now described by focusing on how the image data having been saved in backup storage may be reproduced.

When a plurality of recording media are present in the electronic camera 100, i.e., when at least either the memory card 123a or the memory card 123b, in addition to the internal memory 113, is loaded, the electronic camera can be set in a backup mode by the user through an operation at the operation unit 121. In the backup mode, identical image data are recorded into different recording media. The recording media into which the image data are to be recorded can be selected by the user by operating the operation unit 121. The embodiment is described by assuming that the user has selected the memory cards 123a and 123b as image data recording locations. It is to be noted that the number of recording media that can be selected is not limited to two. In addition, the control circuit 111 may select recording media based upon their access speeds, as in the first embodiment.

The description is provided by assuming that a photographing operation has been executed in the backup mode and the resulting image data have been recorded into the memory cards 123a and 123b. It is also assumed that the power has not been turned off or the memory cards 123a and 123b have not been taken out subsequently and that the reproduction mode has been selected by the user by operating the operation unit 121. Under these circumstances, the control circuit 111 reads the access speeds at the internal memory 113 and the memory cards 123a and 123b, set forth in compliance with the respective data transmission standards. The control circuit 111 then assigns priority rankings to the internal memory 113 and the memory cards 123a and 123b in relation to their access speeds based upon the access speeds having been read, i.e., their read speeds having been read. Namely, the control circuit 111 sets the priority rankings in the order of; the memory card 123a, the memory card 123b and the internal memory 113. The control circuit 111 then designates the memory card 123a with the higher priority ranking of the two memory cards 123a and 123b, into which the image data have been recorded in the backup mode, as the recording medium from which the image data are to be read out.

As the recording medium from which the image data are to be read out is designated, the control circuit 111 displays the designated recording medium at the sub-display unit 125, as shown in FIG. 7. In FIG. 3, a rectangle 1, a rectangle 2 and a rectangle 3 respectively represent the memory card 123a, the memory card 123b and the internal memory 113. It is to be noted that the icons representing the recording media may take on a shape other than the rectangular shape. Since the memory card 123a has been designated as described above, the rectangle 1 is presented in a hyperchromic display and the rectangles 2 and 3 are presented in hypochromic displays at the sub-display unit 125.

In reference to the flowchart presented in FIG. 8, various processing steps of the recording medium selection processing executed in the electronic camera 100 in the embodiment are described. The processing steps shown in FIG. 8 are executed by the control circuit 111 based upon a program. The program enabling the control circuit to execute the processing steps in FIG. 8, stored in a memory (not shown), is started up as a signal indicating that the reproduction mode has been selected is input from the operation unit 121.

The processing executed in step S310 (making a decision as to whether or not a plurality of recording media are present) through step S330 (giving priority rankings to the recording media) is identical to the processing executed in step S110 (making a decision as to whether or not a plurality of recording media are present) through step S130 (giving priority rankings to the recording media) in FIG. 4. In step S340, a decision is made as to whether or not the power has remained on and the memory cards 123a and 123b have remained loaded following the photographing operation executed in the backup mode. If the power has remained on and the memory cards 123a and 123b have remained loaded following the backup mode photographing operation, an affirmative decision is made in step S340 and the operation proceeds to step S350. However, if the power has been turned off or the memory card 123a or 123b has been taken out following the backup mode photographing operation, a negative decision is made in step S340 and the sequence of processing ends.

In step S350, the recording medium from which the image data are to be read out among the recording media into which the image data have been recorded in the backup mode, is designated based upon the priority rankings having been set in step S330 and then the operation proceeds to step S360. In step S360, the recording medium having been designated in step S350 is indicated at the sub-display unit 125 and the sequence of processing ends.

The following advantage is achieved in the third embodiment described above.

In response to an instruction for reproducing the image data having been obtained and recorded into the memory cards 123a and 123b in the backup mode, the control circuit 111 reads out the image data having been recorded in the memory card 123a with the higher access speed. Thus, since the image data are read out by giving priority to the faster recording medium with the higher read speed and the image thus read out is brought up on display at the main display unit 120, the user is able to view the photographed image promptly.

Fourth Embodiment

The fourth embodiment of the electronic camera according to the present invention is now described. The same reference numerals are assigned to components identical to those of the first embodiment and the following description focuses on the difference from the first embodiment. Unless specially noted, the fourth embodiment is identical to the first embodiment. The embodiment differs from the first embodiment in that it allows selection of a recording medium where the image data are to be recorded by factoring in the remaining capacities at the plurality of recording media in addition to the access speeds at the recording media.

Figure 9:
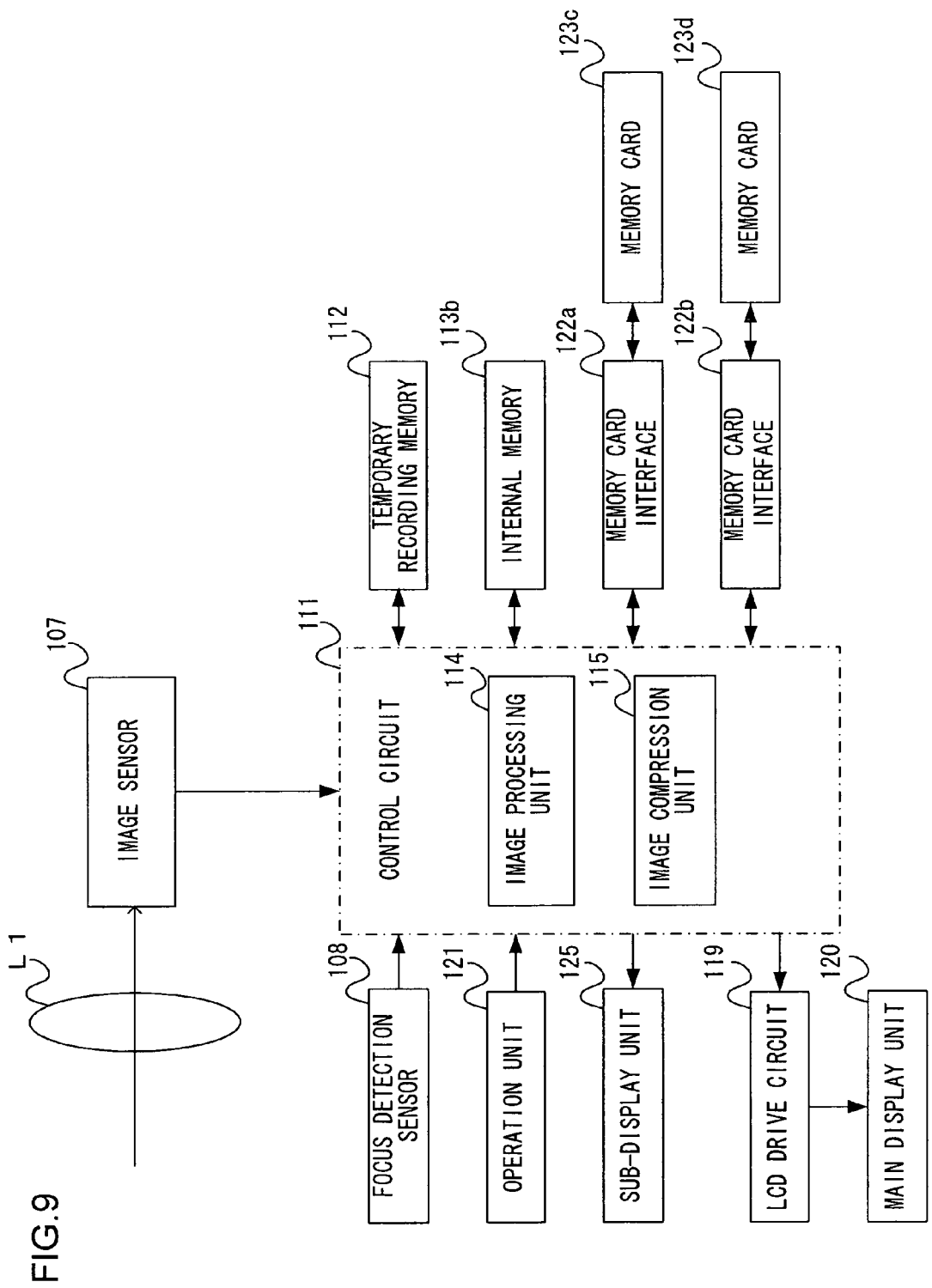

As shown in the block diagram in FIG. 9, the electronic camera 100 achieved in the fourth embodiment includes memory cards 123c and 123d and an internal memory 113b. The control circuit 111 reads the remaining capacities at the memory cards 123c and 123d via the memory card interface 122a and the memory card interface 122b. In addition, the control circuit 111 reads the remaining capacity in the internal memory 113b. In the following description, the processing executed when the access speeds at the three recording media are all different from one another and the processing executed when the access speeds at two of the recording media are equal to each other are individually explained.

1. When the Access Speeds are all Different

In order to facilitate the explanation, it is assumed that the access speeds at the memory cards 123c and 123d and the internal memory 113b and their remaining capacities representing the available memory spaces into which image data can be recorded are as follows.

(1) Memory card 123c (access speed: 9 frames per sec, remaining capacity: 100 frames (JPEG), 20 frames (raw data)
(2) Memory card 123d (access speed: 3 frames per sec, remaining capacity: 1000 frames (JPEG), 200 frames (raw data)
(3) Internal memory 113b (access speed: 5 frames per sec, remaining capacity: 500 frames (JPEG), 100 frames (raw data)

It is to be noted that the quantities of sets of image data that can be recorded into the memory cards 123c and 123d and the internal memory 113b are each calculated based upon the estimated capacity required to record image data expressing a single image frame, corresponding to the image quality level or size having been set, and the quantities of sets of image data that can be recorded will obviously change if a different image quality level or size is set.

The electronic camera 100 assumes one of the following three recording modes. The user is able to select any of the three modes by operating the operation unit 121. It is to be noted that a specific recording mode can be selected in a menu screen brought up on display at the main display unit 120.
(1) Performance priority mode
(2) Photograph quantity priority mode
(3) Balance mode

1-1. Performance Priority Mode

In the performance priority mode, the control circuit 111 selects a recording medium into which image data are to be recorded based upon the access speeds at the internal memory 113b and the exchangeable memory cards 123c and 123d. Namely, as has been explained in reference to the first embodiment, the control circuit 111 gives priority rankings to the three recording media in relation to their access speeds. In the embodiment, the control circuit 111 gives priority rankings in the order of; the memory card 123c, the internal memory 113b and the memory card 123d, as indicated in the recording medium priority ranking chart presented in FIG. 10(a). For instance, image data assuming the normal image quality (JPEG) are recorded into the recording medium with the highest priority ranking by the control circuit 111.

If a plurality of sets of image data with varying image quality levels, e.g., raw data and normal-quality image data are obtained, the control circuit 111 ranks the data sizes of the image data as in the first embodiment. Then, the control circuit 111 selects settings so as to record the high ranked image data (raw data) into the recording medium (memory card 123c) with the highest priority ranking and record the lower ranked data (normal-quality image data) into the recording medium (internal memory 113b) with the second highest priority ranking, as indicated in FIG. 10(b).

1-2. Photograph Quantity Priority Mode

In the photograph quantity priority mode, the control circuit 111 selects a recording medium into which image data are to be recorded based upon the remaining capacities at the internal memory 113b and the exchangeable memory cards 123c and 123d. Namely, the control circuit 111 gives priority rankings to the three recording media so as to give a higher priority ranking to a recording medium with a greater remaining capacity. In the embodiment, the control circuit 111 sets the priority rankings in the order of the memory card 123d, the internal memory 113b and the memory card 123c, as indicated in FIG. 10(a). For instance, image data assuming the normal image quality (JPEG) are recorded into the recording medium with the highest priority ranking by the control circuit 111.

If a plurality of sets of image data with varying image quality levels, e.g., raw data and normal-quality image data, are obtained, the control circuit 111 ranks the data sizes of the image data as in the first embodiment. Then, the control circuit 111 selects settings so as to record the high ranked image data (raw data) into the recording medium (memory card 123d) with the highest priority ranking and record the lower ranked data (normal-quality image data) into the recording medium (internal memory 113b) with the second highest priority ranking, as indicated in FIG. 10(b).

1-3. Balance Mode

In the balance mode, the user is allowed to select the speed at which image data are to be recorded and the number of sets of image data to be recorded. The following explanation is provided by assuming that the user is able to select either four frames per sec or six frames per sec, as the speed at which image data are to be recorded. As the balance mode is selected, the control circuit 111 selects a recording medium among the internal memory 113d and the exchangeable memory cards 123c and 123d, which is the optimal fit for the recording medium conditions related to the access speed or the remaining capacity, having been set by the user.

The control circuit 111 displays the access speeds and the remaining capacities at the various recording media at the sub-display unit 125, as shown in FIG. 11. A rectangle 4, a rectangle 5 and a rectangle 6 in FIG. 11 respectively represent the memory card 123c, the memory card 123d and the internal memory 113b and the access speeds and the remaining capacities at the individual recording media are respectively indicated above the rectangles 4~6. It is to be noted that the access speeds and the remaining capacities may be indicated anywhere near the rectangles 4~6 (e.g., below or beside) or inside the rectangles instead of above the rectangles 4~6.

1-3-1. When an Image Data Recording Speed is Set
1-3-1-1. When Image Data with a Uniform Image Quality Level are Obtained The following explanation is given by assuming that the normal (JPEG) image quality mode setting has been selected. As the user selects a specific image data recording speed (recording speed setting), the control circuit 111 references the access speeds of the memory cards 123c and 123d and the internal memory 113b. Then, the control circuit 111 gives priority rankings to the recording media by giving a higher priority ranking to a recording medium assuming a recording speed equal to or higher than the recording speed setting with a lesser extent of deviation from the recording speed setting.

The following description is provided by assuming that the selected image data recording speed setting is four frames per sec. Under these circumstances, the control circuit 111 gives the highest priority ranking to the internal memory 113b with the recording speed of five frames per sec and gives the second-highest priority ranking to the memory card 123c with the recording speed of nine frames per sec, as indicated in FIG. 10(a). The memory card 123d with the recording speed thereof (three frames per sec) lower than the recording speed setting, is given the lowest priority ranking. Once the priority rankings for the recording media have been set as described above, the control circuit 111 displays the rectangle 6 in a hyperchromic display and the rectangles 4 and 5 in hypochromic displays at the sub-display unit 125, as shown in FIG. 11(a).

Likewise, if the selected image data recording speed setting is six frames per sec, the control circuit 111 references the access speeds at the memory cards 123c and 123d and the internal memory 113b and gives priority rankings for the recording media. Consequently, the priority rankings are awarded in the order of; the memory card 123c, the internal memory 113b and the memory card 123d as indicated in FIG. 10(a). Once the priority rankings have been set for the recording media, as described above, the control circuit 111 displays the rectangle 4 in a hyperchromic display and the rectangles 5 and 6 in hypochromic displays at the sub-display unit 125, as indicated in FIG. 11(*b*).

1-3-1-2. When a Plurality of Sets of Image Data with Varying Image Quality Levels are Obtained The following explanation is given by assuming that the raw+normal (JPEG) image quality mode setting has been selected. As a specific image data recording speed is set (as a specific recording speed setting is selected), the control circuit 111 gives priority rankings to the recording media by giving a higher priority ranking to a recording medium assuming a recording speed equal to or higher than the recording speed setting with a lesser extent of deviation from the recording speed setting. Assuming that the selected image data recording speed setting is four frames per sec, the control circuit 111 gives priority rankings in the order of; the internal memory 113*b*, the memory card 123*c* and the memory card 123*d*.

As in the first embodiment, the control circuit 111 estimates image data sizes and ranks the data sizes. Namely, the control circuit 111 ranks the data sizes in the order of; the raw data and the normal-quality image data. Then, the control circuit 111 selects the recording medium with the highest priority ranking among the recording media having been given priority rankings as described earlier, as the recording medium in which the high ranked raw data are to be recorded. In the example, the control circuit 111 selects the internal memory 113*b* as the raw data recording location.

Next, the control circuit 111 selects the recording medium with the second-highest priority ranking as the recording medium into which the low-ranked normal-quality image data are to be recorded. In other words, the memory card 123*c* is selected as the recording medium into which the normal-quality image data are to be recorded. The priority rankings are thus set by the control circuit 111, as indicated in FIG. 10(*b*). Upon setting the priority rankings for the recording media as described above, the control circuit 111 displays the rectangle 6 in a hyperchromic display and displays a "RAW" mark under the rectangle 6 so as to indicate that the corresponding recording medium has been designated as the raw data recording location at the sub-display unit 125, as shown in FIG. 11(*c*). In addition, the control circuit 111 displays the rectangle 4 in a hyperchromic display and displays a "JPEG" mark under the rectangle 4 so as to indicate that the corresponding recording medium has been designated as the normal-quality image data recording location at the sub-display unit 125. The rectangle 5 representing the memory card 123*d* is displayed in a hypochromic display. It is to be noted that the control circuit 111 sets the memory card 123*d* as a backup for the internal memory 113*b* and the memory card 123*c* so that if the remaining capacity at the internal memory 113*b* or the memory card 123*c* becomes less than that required for recording the image data, the raw data or the normal-quality image data are recorded into the memory card 123*d*.

If the selected image data recording speed setting is six frames per sec, the control circuit 111 gives priority rankings in a similar manner in the order of; the memory card 123*c*, the internal memory 113*b* and the memory card 123*d*. In this situation, only the memory card 123*c* assures a recording speed higher than the recording speed setting (six frames per sec). Accordingly, regardless of the ranks assigned to the various types of image data, the control circuit 111 selects settings so as to record the raw data and the normal-quality image data into the memory card 123*c* with the highest priority ranking. Namely, as indicated in FIG. 10(*b*), the raw data and the normal-quality image data are set to be recorded into the recording medium selected in the priority order of; the memory card 123*c*, the internal memory 113*b* and the memory card 123*d*. At this time, the control circuit 111 displays the rectangle 4 in a hyperchromic display and the rectangles 5 and 6 in hypochromic displays with the "RAW" mark and the "JPEG" mark displayed under the rectangle 4 at the sub-display unit 125, as shown in FIG. 11(*d*).

1-3-2. When a Specific Number of Sets of Image Data to be Recorded is Set 1-3-2-1. When Image Data with a Uniform Image Quality Level are Obtained The following explanation is given by assuming that the normal (JPEG) image quality mode setting has been selected. As the user selects a specific number of sets of image data to be recorded (as the user selects a specific recording quantity setting), the control circuit 111 reads the remaining capacities at the memory cards 123*c* and 123*d* and the internal memory 113*b*. Based upon the remaining capacities thus read, the control circuit 111 gives priority rankings by giving a higher priority ranking to a recording medium with the remaining capacity thereof allowing sets of image data to be recorded therein in a quantity exceeding the recording quantity setting by a greater margin. If none of the recording media has a remaining capacity that will allow sets of image data to be recorded in a quantity exceeding the recording quantity setting, the control circuit 111 gives higher priority rankings to the recording media with greater remaining capacities.

Assuming that the selected recording quantity setting is 700 frames, the control circuit 111 awards the highest priority ranking to the memory card 123*d* with the remaining capacity thereof equivalent to 1000 frames, as indicated in FIG. 10(*a*). In addition, the control circuit 111 gives the second-highest priority ranking to the internal memory 113*b* with the remaining capacity thereof equivalent to 500 frames and gives the third-highest priority ranking to the memory card 123*c* with the remaining capacity thereof equivalent to 100 frames. The control circuit 111 then displays the rectangle 4 in a hyperchromic display and the rectangles 5 and 6 in hypochromic displays at the sub-display unit 125, as shown in FIG. 11(*e*).

1-3-2-2. When a Plurality of Sets of Image Data with Varying Image Quality Levels are Obtained The following explanation is given by assuming that the raw+normal (JPEG) image quality mode setting has been selected. As described earlier, as the user selects a specific recording quantity setting for image data, the control circuit 111 gives priority rankings by giving the highest priority ranking to the recording medium with the remaining capacity thereof allowing sets of image data to be recorded therein in a quantity exceeding the recording quantity setting by the greatest margin. In addition, as in the first embodiment, the control circuit 111 estimates image data sizes and ranks the data sizes. Namely, the control circuit 111 ranks the data sizes in the order of; the raw data and the normal-quality image data. Then, the control circuit 111 selects the recording medium with the highest priority ranking among the recording media having been given priority rankings as described earlier, as the recording medium in which the high ranked raw data are to be recorded.

Assuming that the selected recording quantity setting is 200 frames, the control circuit 111 awards the highest priority ranking to the memory card 123*d* with the remaining capacity thereof equivalent to 200 frames of raw data and sets the memory card 123*d* as the raw data recording location, as indicated in FIG. 10(*b*). The control circuit 111 also gives the second-highest priority ranking to the internal memory 113*b* with the remaining capacity thereof equivalent to 500 frames of normal-quality image data and sets the internal memory 113*b* as the normal-quality image data recording location. At this time, the control circuit 111 displays the rectangles 5 and 6 in hyperchromic displays with the "RAW" mark displayed under the rectangle 5 and the "JPEG" mark displayed under the rectangle 6 at the sub-display unit 125, as shown in FIG. 11(*f*). In addition, the control circuit 111 displays the rectangle 4 in a hypochromic display.

2. When the Access Speeds at Two Recording Media are Equal

In order to facilitate the explanation, it is assumed that the access speeds at the memory cards 123*c* and 123*d* and the internal memory 113*b* and their remaining capacities representing the available memory spaces into which image data can be recorded are as follows.
(1) Memory card 123*c* (access speed: 6 frames per sec, remaining capacity: 10 frames (JPEG), 2 frames (raw data)
(2) Memory card 123*d* (access speed: 6 frames per sec, remaining capacity: 1000 frames (JPEG), 200 frames (raw data)
(3) Internal memory 113*b* (access speed: 4 frames per sec, remaining capacity: 3000 frames (JPEG), 600 frames (raw data)

2-1. Performance Priority Mode

In the performance priority mode, the control circuit 111 reads the access speeds and the remaining capacities at the internal memory 113*b* and the memory cards 123*c* and 123*d* as described earlier. Upon determining that the access speed of the memory cards 123*c* and 123*d* are equal to each other, the control circuit 111 compares the remaining capacities at the memory cards 123*c* and 123*d* having been read. The control circuit 111 gives a higher priority ranking to the recording medium with a greater remaining capacity of the two recording media with the access speeds thereof equal to each other. Accordingly, the control circuit 111 gives priority rankings in the order of; the memory card 123*d*, the memory card 123*c* and the internal memory 113*b*, as indicated in FIG. 12.

2-2. Photograph Quantity Priority Mode

In the photograph quantity priority mode, the control circuit 111 gives priority rankings by giving a higher priority ranking to a recording medium with a greater remaining capacity based upon the remaining capacities at the internal memory 113*b* and the memory cards 123*c* and 123*d*, as has been described earlier. Accordingly, the control circuit 111 sets the priority rankings in the order of; the internal memory 113*b*, the memory card 123*d* and the memory card 123*c* as indicated in FIG. 12.

2-3. Balance Mode 2-3-1. When an Image Data Recording Speed is Set

As the user sets a specific image data recording speed (as the user selects a specific recording speed setting), the control circuit 111 gives priority rankings to the recording media by giving a higher priority ranking to a recording medium assuming a recording speed equal to or higher than the recording speed setting with a lesser extent of deviation from the recording speed setting, as has been explained earlier. Upon determining that a plurality of recording media assume recording speeds equal to each other and exceeding the recording speed setting, the control circuit 111 compares the remaining capacities at the recording media with the same recording speed based upon the remaining capacities having been read. The control circuit 111 then gives a higher priority ranking to the recording medium with the greater remaining capacity of the two recording media with the same recording speed.

Assuming that the selected image data recording speed setting is five frames per sec, the control circuit 111 gives the highest priority ranking to the memory card 123*d* with the recording speed of six frames per sec and the remaining capacity thereof equivalent to 1000 frames and gives the second-highest priority ranking to the memory card 123*c* with the recording speed of six frames per sec and the remaining capacity thereof equivalent to 10 frames. The internal memory 113*b* with the recording speed thereof (four frames per sec) lower than the recording speed setting is given the third-highest priority ranking.

2-3-2. When a specific number of sets of image data to be recorded is set

As in the photograph quantity priority mode described above, the control circuit 111 gives priority rankings based upon the remaining capacities at the three recording media by giving a higher priority ranking to a recording medium with a greater remaining capacity. Accordingly, the control circuit 111 gives priority rankings in the order of; the internal memory 113*b*, the memory card 123*d* and the memory card 123*c*, as indicated in FIG. 12.

It is to be noted that each time a memory card changeover is detected via the memory card interface 122*a* or 122*b*, the control circuit 111 gives priority rankings. If the recording media priority rankings are altered as a result, the control circuit 111 sets the recording medium newly awarded with the highest priority ranking as the image data recording location.

For instance, while the priority rankings are set in the order of; the memory card 123*c*, the internal memory 113*b* and the memory card 123*d*, as indicated in FIG. 10(*a*) in the performance priority mode, the memory card 123*d* may be replaced with another memory card 123*e* (see FIG. 13). Under such circumstances, the control circuit 111 detects the access speed of the memory card 123*e* via the memory card interface 122*a* and sets new priority rankings for the memory cards 123*c* and 123*e* and the internal memory 113*b*. Assuming that the access speed of the memory card 123*e* is 10 frames per sec, the control circuit 111 gives priority rankings in the order of the memory card 123*e*, the memory card 123*c* and the internal memory 113*b*, as indicated in FIG. 13(*a*). As a result, the image data recording medium is switched from the memory card 123*c* to the memory card 123*e*.

In addition, while the raw+normal image quality mode setting is selected, i.e., the priority rankings for the recording media are set as indicated in FIG. 10(*b*), in the performance priority mode, the memory card 123*d* may be replaced with another memory card 123*e* (see FIG. 13). In this case, too, the control circuit 111 detects the access speed of the memory card 123*e* via the memory card interface 122*a* and gives priority rankings in the order of the memory card 123*e*, the memory card 123*c* and the internal memory 113*b*. Then, the control circuit 111 sets the memory card 123*e* with the highest priority ranking as the recording medium into which the high ranked raw data are to be recorded and selects the memory card 123*c* with the second-highest priority ranking as the recording medium into which the normal-quality image data are to be recorded. As a result, the raw data recording medium is switched from the memory card 123*c* to the memory card 123*e*. In addition, the normal-quality image data recording medium is switched from the memory card 123*d* to the memory card 123*c*.

In addition to the advantages of the first embodiment, the following advantages are achieved through the fourth embodiment described above.

(1) In the balance mode, the control circuit 111 selects a recording medium into which image data are to be recorded based upon the access speeds and the remaining capacities at the internal memory 113*b* and the exchangeable memory cards 123c and 123d. As a result, since the optimal recording medium among the plurality of recording media can be selected to best suit the user's requirements, e.g., the fastest recording speed or the maximum recording quantity, an undesirable state in which images cannot be photographed due to a low access speed or a small remaining capacity at the recording medium does not occur.

(2) The control circuit 111 displays the access speeds and the remaining capacities of the memory cards 123c and 123d and the internal memory 113b respectively above the rectangles 4~6 corresponding to the individual recording media at the sub-display unit 125. Since the user is able to verify the access speeds and the remaining capacities at the various recording media on display at the sub-display unit 125 and is thus able to ascertain why a specific recording medium has been selected by the control circuit 111, better user convenience is assured.

The electronic camera 100 achieved in any of the first through fourth embodiments described above allows for the following variations.

(1) Instead of recording image data into three recording media, i.e., the internal memory 113 and the two memory cards, image data may be recorded into two recording media, i.e., the internal memory 113 and a single memory card. As an alternative, the electronic camera 100 equipped with the internal memory 113 may allow three or more memory cards to be loaded therein.

(2) Instead of referencing the data transmission standards written in the recording media and indicating the access speeds thereof when setting the priority rankings for the recording medium in relation to their access speeds, the control circuit 111 may write test data of a predetermined size into the recording media and ascertain through measurement the access speed at each recording medium by measuring the length of time required to write the test data.

(3) Instead of selecting recording media into which a plurality of sets of image data assuming varying data sizes are to be recorded, recording media into which a plurality of different image files assuming a uniform file size are to be recorded may be selected. Different image files assuming a uniform file size may be generated when, for instance, image data in one image file and the image data in another image file have undergone different types of image processing (AE bracket processing, color processing and the like) i.e., when the image data in the different image files assume different parameters. In such a case, the control circuit 111 should select recording media in a quantity corresponding to the number of image files starting with the recording medium having the highest priority ranking, among the plurality of recording media.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention. In addition, the present invention allows the embodiments to be adopted in any combination thereof and also allows an embodiment to be adopted in combination with one of a plurality of variations.

The disclosure of the following priority application is herein incorporated by reference:
Japanese Patent Application No. 2007-212672 filed Aug. 17, 2007

The invention claimed is:
1. A digital camera, comprising:
a generating unit that generates image data by capturing an image of a subject;
a recording control unit that records the image data obtained by capturing the image of the subject into a first recording media with a first access speed and a second recording media with a second access speed;
a decision-making unit that decides which is faster between the first access speed and the second access speed; and
an estimation unit that estimates a data size of a first image data and a data size of a second image data to be generated by the generating unit in accordance with a single instruction of image capturing based upon image quality set by an user, wherein:
if the decision-making unit decides that the first access speed is faster than the second access speed, the recording control unit records the first image data into the first recording media and the second image data into the second recording media, the first image data and the second image data being generated by the generating unit in accordance with the single instruction of image capturing, and the data size of the second image data being smaller than the data size of the first image data; and
if the decision-making unit decides that the first access peed is faster than the second access speed, the recording unit records the first image data, of which the data size is estimated to be larger than the data size of the second image data, into the first recording media, and records the second image data, of which the data size is estimated to be smaller than the data size of the first image data, into the second recording media.

2. The digital camera according to claim 1, wherein:
the generating unit further comprises a compression processing unit that generates image data executed under a compression process, wherein:
the first image data is generated without the compression process by the compression processing unit and the second image data is generated by engaging the compression unit in execution of the compression processing on the image data.

3. A digital camera, comprising:
an imaging unit that obtains image data by capturing an image of a subject;
a recording control unit that records the image data obtained by capturing the image of the subject into a plurality of recording media;
a speed detection unit that detects access speeds at each of the plurality of recording media; and
a selection unit that selects the recording media, into which image data are to be recorded by the recording control unit, based upon each of the access speeds having been detected, wherein:
at least one of the plurality of recording media is an exchangeable recording medium,
the digital camera further comprising:
a processing unit that generates a plurality of sets of image data by processing the image data having been obtained via the imaging unit; and
a size detection unit that detects data sizes of each of the plurality of sets of image data, wherein:
the selection unit individually selects the recording media into which the plurality of sets of image data are to be recorded in correspondence to the data sizes having been detected;
the plurality of recording media includes more than or equal to three recording media; and
when the recording control unit is to record image data into more than or equal to three recording media, the selection unit selects the recording media so that image data with a largest data size are recorded into a recording medium with a highest access speed.

* * * * *